United States Patent

Heyer

[11] 4,017,575
[45] Apr. 12, 1977

[54] PRODUCTION OF A FLAT THERMOPLASTIC FILM BY PASSING THE FILM OVER A BEARING HAVING A LUBRICATING FLUID ON THE SURFACE THEREOF

[75] Inventor: David E. Heyer, Circleville, Ohio

[73] Assignee: E. I. Du Pont de Nemours and Company, Wilmington, Del.

[22] Filed: Aug. 16, 1973

[21] Appl. No.: 388,835

Related U.S. Application Data

[63] Continuation of Ser. No. 232,764, March 8, 1972, abandoned, which is a continuation-in-part of Ser. No. 23,390, March 27, 1970, abandoned.

[52] U.S. Cl. .............................. 264/89; 264/93; 264/216; 425/224
[51] Int. Cl.$^2$ ................................ B29D 7/02
[58] Field of Search ............... 264/89, 93, 216; 425/223–224

[56] References Cited

UNITED STATES PATENTS

| 2,987,767 | 6/1961 | Berry et al. | 264/95 |
| 3,008,185 | 11/1961 | Goldman | 264/89 |
| 3,038,209 | 6/1962 | Hunter, Jr. et al. | 264/212 |
| 3,061,940 | 11/1962 | Cichelli | 34/18 |
| 3,268,766 | 8/1966 | Amos | 317/2 |
| 3,423,493 | 1/1969 | Klenk et al. | 264/216 |
| 3,468,995 | 9/1969 | Nelson | 264/237 |

FOREIGN PATENTS OR APPLICATIONS

| 250,616 | 2/1961 | Australia | 264/95 |

*Primary Examiner*—Robert F. White
*Assistant Examiner*—James B. Lowe

[57] ABSTRACT

In the casting of molten thermoplastic web onto a moving quenching surface, the improvement which comprises passing the freshly extruded web over a bearing having a lubricating fluid on the surface thereof.

1 Claim, 8 Drawing Figures

U.S. Patent  April 12, 1977  Sheet 1 of 2  4,017,575
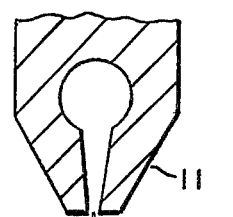
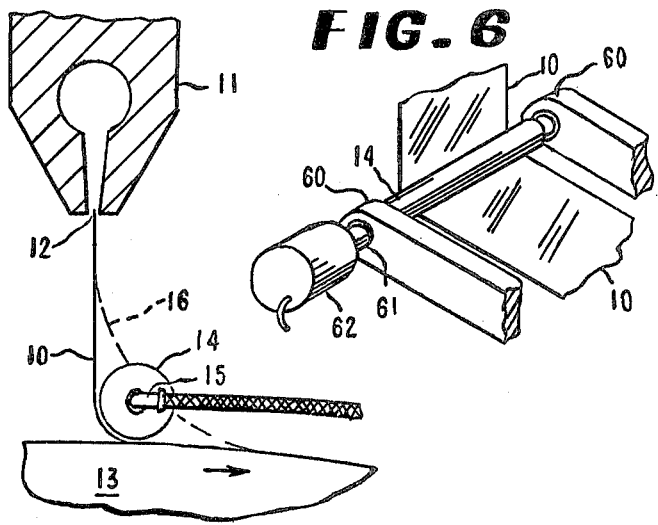
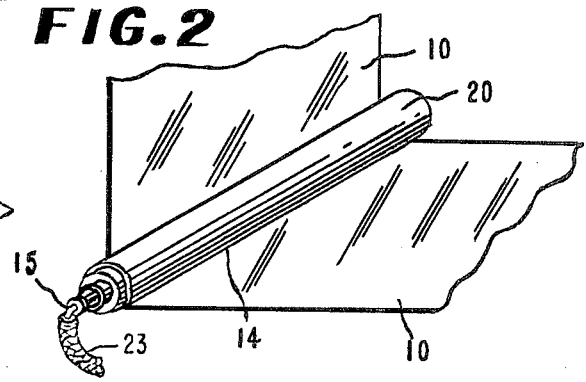
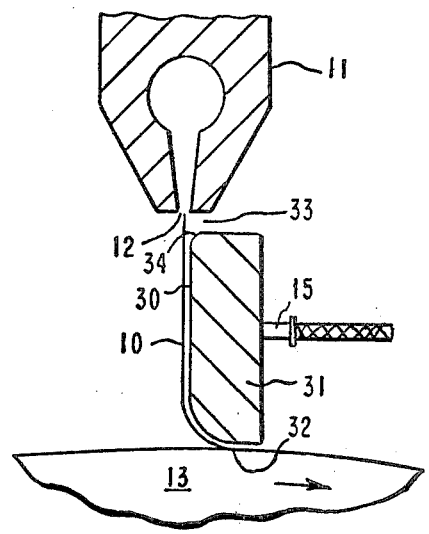
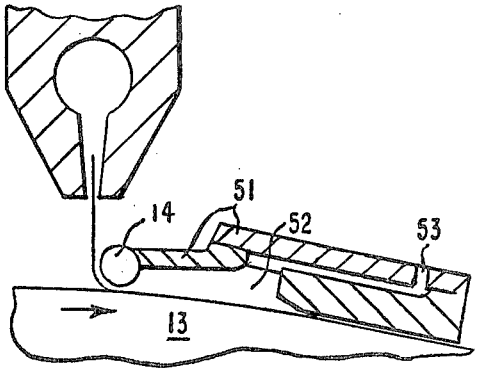

PRODUCTION OF A FLAT THERMOPLASTIC FILM BY PASSING THE FILM OVER A BEARING HAVING A LUBRICATING FLUID ON THE SURFACE THEREOF

CROSS-REFERENCE TO RELATED APPLICATION

This is a continuation of application Ser. No. 232,764 filed Mar. 8, 1972 now abandoned, which in turn is a continuation-in-part of application Ser. No. 23,390, filed Mar. 27, 1970 and now abandoned.

BACKGROUND OF THE INVENTION

Conventional methods of preparing thermoplastic polymeric film include casting a sheet of molten polymer through a slit die onto a cooled quenching surface to stabilize and solidify the film. It is desirable to bring the freshly extruded web into close and rapid contact with the quenching surface in order to cool the film to a stable temperature in the shortest period of time, thus minimizing crystallization of the polymer. To this end, various expedients have been employed to force the extruded web into intimate contact with the drum. Devices commonly used include jets of air applied at the edges of the extruded film or across the full width of the film by means of an air knife, and apparatus for applying an electrostatic charge to the film to cause it to more closely adhere to the quenching surface.

In spite of many varied techniques previously used to urge the freshly extruded web into contact with the quenching surface, difficulties remain which result in gauge variation in the finished film product and limit the speed at which film can be cast while maintaining excellent clarity. While electrostatic pinning is most effective for this purpose, increased speed often results in the inclusion of air bubbles between the freshly extruded film and the quenching surface, causing surface imperfections in the finished film product. In addition, perturbations in roll rotation, variations in polymer composition and temperature as well as air currents encountered immediately outside of the extrusion die have caused variation in the free melt path position and in the point at which the freshly extruded web touches down onto the quenching surface across the width of the extruded web.

SUMMARY OF THE INVENTION

The instant invention provides an improvement in the process for the preparation of thermoplastic film in which a molten web is cast from an extrusion die onto a moving quenching surface, which improvement comprises passing the web over a bearing positioned between the orifice of the extrusion die and the normal touchdown point of the web onto the quenching surface, the bearing having a layer of fluid on the surface thereof, the fluid being maintained at a distributed pressure equal to the pressure exerted toward the bearing surface as a result of the tension of the web, and the bearing being so positioned as to displace the web from its normally catenary path to a more vertical path from the extrusion die to the quenching surface.

In a particularly preferred embodiment, the web is additionally passed adjacent but out of contact with an electrostatic point probe positioned above each edge of the web to impart an electrostatic charge thereto; and the web is brought into more intimate contact with the quenching surface by means of air pressure supplied by a pressure box applying a substantially uniform field of air pressure onto the surface of the web; and applying, in combination therewith, increased pressure localized at the web edges by means of at least two air jets positioned over the lateral edge portions of the web.

BRIEF DESCRIPTION OF THE DRAWINGS

FIG. 1 is a schematic cross-sectional illustration of a representative apparatus which can be used in the instant invention, employing a tubular porous bearing.

FIG. 2 is a perspective view of a porous bearing which can be used in the apparatus of FIG. 1.

FIG. 3 is a schematic cross-sectional illustration of another apparatus which can be used in the instant invention employing a bearing having greater surface area in contact with an extruded web.

FIG. 4 is a cross-sectional illustration of an apparatus which can be used in the invention in combination with electrostatic edge pinning apparatus.

FIG. 5 is still another cross-sectional view of an apparatus which can be used in the invention in combination with a gas pressure pinning device.

FIG. 6 is a perspective view of yet another embodiment useable in the instant invention.

DESCRIPTION OF THE PREFERRED EMBODIMENTS

Figure 7:
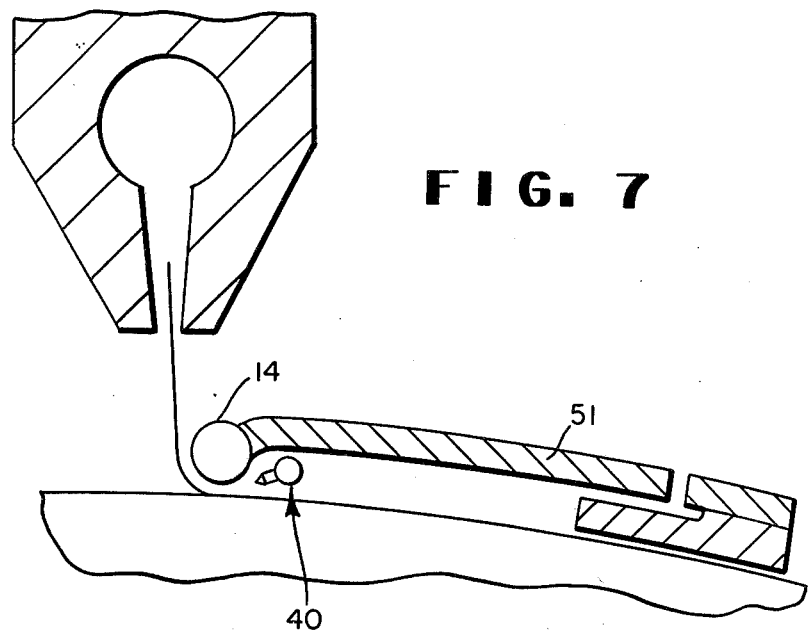
FIG. 7 is a cross-sectional view of an additional apparatus which can be used in the invention.

The required layer of lubricating fluid on the surface of the bearing can be provided externally or internally, as best suits the particular extrusion and quenching apparatus. For example, a rotary hydrodynamic bearing can be employed which is rotated at a sufficient speed to pump a layer of air between the molten web and the circumferential surface of the bearing. For most efficient operation, the bearing is rotated in the same direction as the direction of travel of the molten web. Preferably, however, the bearing is a stationary, porous bearing, the layer of lubricating fluid being supplied from the interior of the bearing through the porous surface.

The surface of the bearing over which the web is passed should form a curve which is described by a monotonically increasing function having no points of inflection with respect to rectangular coordinates at the touchdown point of the thermoplastic web onto the quenching surface. That is, the surface of the bearing should be free from irregular curvature which might result in the interruption of the smooth flow of the web from the extrusion orifice onto the quenching surface.

The particular shape of the bearing is dependent to some extent on the means by which the layer of fluid is supplied to the surface of the bearing. For example, a rotary bearing, in which a layer of air is pumped between the molten web and the moving bearing surface is necessarily cylindrical. A cylindrical surface for a stationary porous bearing has also been found to be the most convenient. However, the porous bearing could, for maximum control of the web, be in the form of a single curved surface extending from about the touchdown point of the web onto the quenching surface upward to a point adjacent to the downstream lip of the extrusion die. The porous bearing should not, however, be continuous with the downstream lip of the extrusion die. That is, a passageway for air between the edge of the lip and the uppermost part of the porous bearing should be retained. The size of the passageway will vary considerably with the polymer, temperature, extrusion speeds and air pressure. However, failure to leave a sufficient gap between the lip and the uppermost portion of the bearing may result in a concentration of air pressure just outside of the lip and an undesirable distortion of the web at that point.

The bearings used in the instant invention should generally have a uniform resistance to air flow on at least the surface over which the freshly extruded web is passed. The surface of a rotary hydrodynamic bearing is preferably a smooth metal surface such as stainless steel, chromium, or polished bronze. Any surface asperities should have a height substantially less than the thickness of the air layer to be maintained on the surface of the bearing, to preclude contact of the molten web and the bearing surface. The surface of porous bearings can be fabricated from a pervious material such as a sintered metal, e.g., sintered bronze, copper, stainless steel or aluminum. Alternatively, the surface can be prepared from other fluid-pervious structures such as aggregates of small metal balls of the size of bird shot, welded or soldered together so as to provide air passages of substantially uniform size and distribution. Still other materials suitable for the porous surface include sintered wire matrixes, permeable ceramics, and perforated structures.

The porosity of the bearing should be such as to permit the passage of a sufficient quantity of fluid to maintain a distributed fluid pressure on the surface of the bearing equal to the pressure exerted toward the bearing surface as a result of the tension of the web. While the particular porosity of the bearing surface is not critical to the operation of the instant process beyond this requirement, porosities of about from 5 to 35 microns (MOTT) have been found particularly effective in the instant invention for use with a gaseous lubricating fluid.

The lubricating fluid should be maintained as a continuous layer on that portion of the external surface of the bearing which is adjacent the thermoplastic web. The pressure should not be so great, however, for maximum stability of polyethylene terephthalate, as to maintain the extruded web at a distance greater than about from 10 to 15 mils from the surface of the bearing. Further, the web is generally not consistently maintained out of contact with the bearing surfaces when the average distance from the surface is less than about 0.1 mil, since even highly polished bearing surfaces can have surface asperities of this magnitude. In general, a distance of 5 to 10 mils from the bearing surface is found to provide maximum stability and control of the freshly extruded polyethylene terephthalate web.

The length of the porous bearing used in the instant process is generally at least equal to the full width of the freshly extruded web. However, bearings somewhat narrower than the full width can be used when the edges of the extrudedsheet are trimmed as waste. As indicated above, the particular cross-sectional size and configuration of the bearing is not a critical feature of the instant invention beyond the requirements of positioning and uniform curvature indicated above. Cylindrical tubes having a diameter of about 1 inch can be used effectively.

The particular lubricating fluid on the surface of the bearing can be a gas or low-viscosity liquid compatible with the extruded polymer. Gases which can be used effectively include air, oxygen and steam. The particular fluid pressure required will necessarily vary according to polymer composition, film thickness, and the speed and geometry of the extrusion and quenching apparatus. In the extrusion of polyethylene terephthalate film using a porous bearing, an internal air pressure of 1 psi has been found satisfactory for use with a stainless steel bearing having a porosity of 5 microns.

The instant invention is beneficially used in combination with conventional apparatus used to pin a thermoplastic web to a quenching surface. For example, the bearing can be used in accordance with the instant invention in combination with an air knife across the entire width of the freshly extruded web or air jets directed toward the edges of the web to stabilize the width of the thermoplastic film. Another pinning means which can beneficially be used in combination with the bearing is a static pressure device which applies a uniform field of air pressure across an area of the thermoplastic film on the quenching surface to bring the film into more intimate contact with the surface. The force applied by a pressure device should be substantially static, with any air flow from the box being laminar rather than turbulent, to prevent distortion of the web. Laminar flow is obtained by varying the contours of the pressure chamber and the use of relatively low air pressures.

Further quenching aids which can be used in conjunction with the instant invention include various electrostatic pinning means which impart an electrostatic charge to the surface of the web, including a wire across the full width of the extruded web or electrostatic probes directed toward the edges of the extruded film on the drum.

A particularly preferred apparatus combination for use in the instant invention involves the use of a static pressure device in conjunction with electrostatic pinning probes directed at the edges of the web, as well as air jets. With this combination, when a plurality of jets are arranged in a pattern similar to that shown in FIG. 8, exceptionally good quenching is obtained in combination with a more uniform edge profile that reduces waste due to edge trim of the finished film product.

The instant invention is applicable to the quenching of any organic thermoplastic film-forming polymeric material, including, for example, polyesters such as polyethylene terephthalate, polyethylene-2,6-naphthalate, polytetramethylene-1,2-dioxybenzoate and polyethylene-1,5-naphthanate; polyamides such as polyhexamethylene adipamide, polyhexamethylene sebacamide and polycaproamide; and vinylidene chloride. While the above polymeric materials are generally crystallizable, the invention is equally applicable to those organic thermoplastic polymers which are normally amorphous and which do not crystallize, such as polystyrene and polymethyl methacrylate.

The advantages of the instant invention are realized when a thermoplastic film is extruded onto any of a variety of quenching surfaces, including, for example, quench drums or cooled endless belts. The particular configuration of the quenching surface is not critical, both highly polished and matte surfaces having been used effectively. The advantages of the instant invention result primarily from the stabilization of the free span of freshly extruded web from the extrusion die orifice to the touchdown point onto the quenching surface. At this point, the freshly extruded web is susceptible to machinery vibration as well as deformation from occasional air currents in the extrusion area.

These factors, together with variation in temperature, polymer composition and other factors often result in a variation in the point at which the freshly extruded web touches down onto the quenching surface across the width of the web and a variation in the melt draw length across the width of the film. The bearing of the instant invention isolates the free melt span from position disturbing influences. Accordingly, films processed according to the instant invention are characterized by a more stable and uniform touchdown point across the width of the film, which contributes to better gauge uniformity and more uniform quenching. Since the bearing, in accordance with the instant invention, is positioned so as to deflect the freshly extruded web from its normal catenary path to a more vertical path to the quenching surface the approach angle of the web to the quenching surface is modified toward an earlier tangential approach. This earlier tangential approach angle results in a lessening of the tendency of the inclusion of air between the quenching surface and the web, thereby resulting in more efficient heat transfer and more rapid quenching.

The invention is further illustrated by the figures, in which like elements are represented by the same numbers.

FIG. 1 is a cross-sectional view of a representative apparatus arrangement which can be used in accordance with the instant invention. In that figure, thermoplastic web 10 is extruded from extrusion die 11 through orifice 12 formed in the extrusion die. The film is extruded onto the surface of quench drum 13. Porous bearing 14 is positioned so as to deflect the path of the freshly extruded web, the normal catenary path of the web being indicated by broken line 16. The porous bearing is supplied with air or other fluid through inlet 15.

FIG. 2 is a perspective view of the bearing illustrated in FIG. 1. The bearing is substantially tubular and, in this embodiment of the invention, is non-rotatable. The surface of the bearing has porous surface 20 and the width of the bearing is substantially coextensive with the freshly extruded web. Gas is introduced to the interior of the tubular bearing through gas inlet 15 which is coupled to flexible conduit 23 which is in turn coupled to a source of compressed gas (not shown).

FIG. 3 is a schematic illustration of still another apparatus which can be used in accordance with the instant invention. In this embodiment, the porous surface 30 of bearing 31 is substantially coextensive with the free span of the freshly extruded web from the orifice of the die to the touchdown point 32 of the web onto the quenching surface. Care should be taken, however, in the employment of this embodiment of the invention to maintain a gap 33 between the downstream lip of the die orifice and the uppermost portion of the bearing surface so as to permit passage of excess fluid around the bearing surface without distorting the path of the freshly extruded web immediately adjacent the die orifice. Upper corner 34 of the porous surface is rounded to reduce the possibility of the freshly extruded web catching on the leading surface of the bearing.

FIG. 4 is a cross-sectional illustration of another embodiment of the instant invention in which the bearing 14 is used in combination with electrostatic edge probes 40. Two edge probes to the type shown are positioned along the lateral edges of the freshly extruded web immediately above the touchdown point of the web onto the drum. The probes are connected to voltage source 41 which facilitates the application of electrostatic charge onto the surface of the film causing the edges to closely adhere to the surface of the drum.

FIG. 5 is a cross-sectional illustration of an apparatus of the instant invention in which the bearing 14 is used in conjunction with a pressure chamber to force the freshly extruded web into close contact with the quenching surface. The pressure chamber comprises an outer casing 51 which forms a cavity 52 immediately above the surface of the freshly extruded web on the quenching surface at and immediately downstream from the touchdown point. Air is supplied to the cavity through inlet and passage 53 from a compressed gas source (not shown).

FIG. 6 is a perspective view of yet another embodiment of the instant invention in which bearing 14 is a rotary mandrel journaled at the ends in anti-friction bearings 60. Extension 61 of bearing 14 is connected to a speed control drive 62 such as a commercial variable speed electric motor or a gas turbine device.

In the figure, the circumferential surface of bearing 14 adjacent the molten web 10 is driven in counter-clockwise direction; that is, in the same direction as the moving web. The resultant action transforms bearing 14 into a self-acting hydrodynamic bearing which pumps a pressure distributed layer of lubricating air between the web and the rotary surface.

FIG. 7 is a cross-sectional illustration of another apparatus which can be used in the instant invention. In that figure, bearing 14 is used in conjunction with both a pressure chamber as illustrated in FIG. 5 and electrostatic edge probes 40 directed at the edges of the freshly extruded web to deposit a charge on the web at the touchdown point of the web onto the drum.

Figure 8:
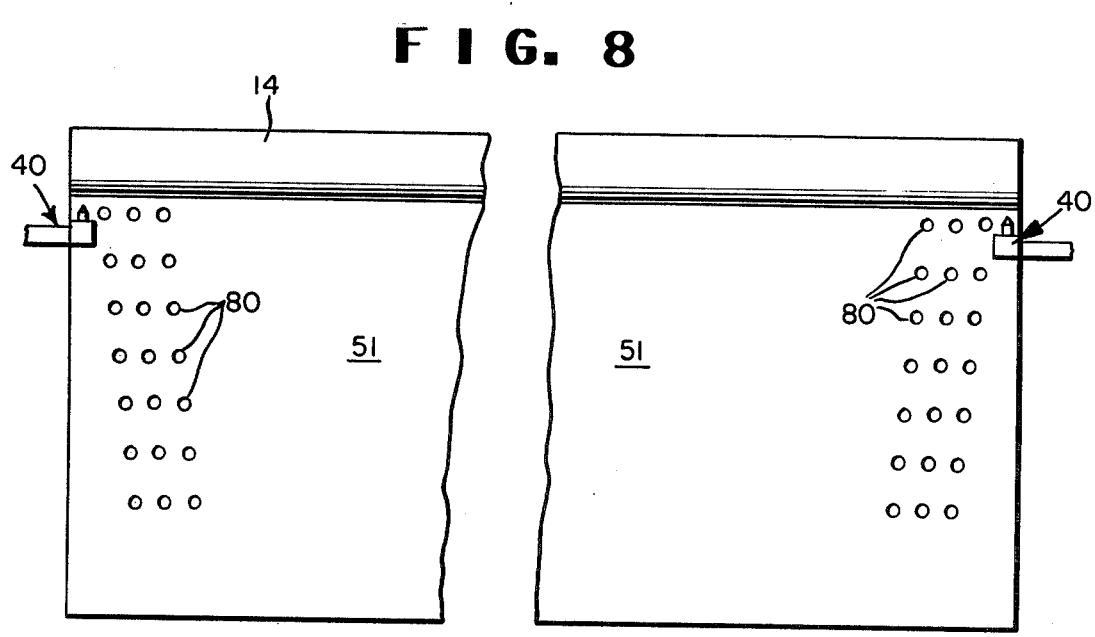
FIG. 8 is a top plane view of yet another apparatus which can be used in the invention.

FIG. 8 is a top plane view of a particularly preferred apparatus for use in the invention, combining, with bearing 14, a pressure chamber 51 and edge probes 40, multiple air jets 80 integrated into the pressure chamber in a pattern that facilitates the formation of a uniform edge profile.

The invention is further illustrated by the following examples.

EXAMPLE 1

Polyethylene terephthalate film is extruded from a slit die at a thickness of 23.5 mils onto a cooled quenching surface. The quenching surface is moving at a moderately high commercial production rate, hereinafter designated R.

A 2 inch diameter porous cylinder is positioned below the extrusion die so as to deflect the freshly extruded web to an approximately vertical path from the orifice to the quenching surface. A layer of air is maintained on the surface of the porous cylinder at a pressure sufficient to maintain the freshly extruded film about 3 to 4 mils out of contact of the surface of the porous cylinder. The film exhibits unusual stability from the die orifice to the touchdown point and touches down onto the quenching surface uniformly across the width of the film.

EXAMPLE 2

A polyethylene terephthalate film is extruded from a slit die, passed over a porous bearing, and subsequently pinned to a cooled, moving quenching surface using an apparatus similar to that illustrated in FIG. 5.

The porous bearing is a sintered stainless steel tube having an overall diameter of three-fourth inch and a porosity of 5 microns. An air pressure of 1.1 pounds per square inch is maintained inside the porous metal tube. This air pressure is sufficient to maintain the freshly extruded web about 8 to 9 mils away from the surface of the bearing. An air pressure of 0.15 inch of water is maintained in the cavity 52 of the pressure box, which facilitates the intimate contact of the web and the quenching surface. The path of the freshly extruded web between the orifice of the extrusion die and the initial point of contact of the web and the porous bearing is substantially vertical. At a quenching rate of about 2R, a uniform touchdown point of the web onto the quenching surface is maintained. The machine direction gauge variation is measured over a span of 5 feet and is found to be about ±0.9%. The product exhibits excellent clarity.

EXAMPLE 3

Example 2 is repeated, except that the quenching speed is increased to 4R and the gap from the die orifice to the drum is approximately doubled. The internal air pressure of the bearing is 0.80 pounds per square inch and the pressure maintained in the cavity of the pressure box is 0.15 inch of water. The resulting film product is found to exhibit excellent gauge uniformity, having a variation of only ±0.78% in the machine direction. The product is clear and has no indication of regularly recurring haze patterns known as "venetian blind haze."

I claim:
1. In the process for the preparation of flat thermoplastic film in which a molten web is cast in a catenary path from an extrusion die onto a moving quenching surface, the improvement which comprises:
   passing the freshly extruded molten web as it moves in a free melt span over a bearing positioned between the orifice of the extrusion die and the normal touchdown point of the web onto the quenching surface;
   providing a layer of fluid on the surface of the bearing;
   displacing the molten web from its catenary path to an earlier tangential approach path from the extrusion die to the quenching surface by means of the layer of fluid on the surface of the bearing;
   maintaining the fluid at a distributed pressure equal to the pressure exerted toward the bearing surface as a result of the tension of the web and sufficient to maintain the freshly extruded web out of contact with the surface of the bearing; and
   applying a uniform field of air pressure onto the surface of the web after its touchdown onto the quenching surface sufficient to facilitate more intimate contact of the web and quenching surface while preparing a film free of recurring haze patterns known as "venetian blind haze."

* * * * *